(12) United States Patent
Okumura

(10) Patent No.: US 7,947,369 B2
(45) Date of Patent: May 24, 2011

(54) PRODUCTION OF FINE SPHERICAL THERMOPLASTIC RESIN PARTICLES

(75) Inventor: Arimichi Okumura, Himeji (JP)

(73) Assignee: Daicel-Degussa Ltd., Tokyo (JP)

( * ) Notice: Subject to any disclaimer, the term of this patent is extended or adjusted under 35 U.S.C. 154(b) by 1010 days.

(21) Appl. No.: 11/439,985

(22) Filed: May 25, 2006

(65) Prior Publication Data
US 2006/0269749 A1    Nov. 30, 2006

(30) Foreign Application Priority Data

May 26, 2005 (JP) ................................. 2005-153262

(51) Int. Cl.
*B32B 5/66* (2006.01)
(52) U.S. Cl. ......... 428/402; 428/403; 428/407; 427/212
(58) Field of Classification Search ................. 428/403, 428/407, 402; 427/212
See application file for complete search history.

(56) References Cited

U.S. PATENT DOCUMENTS

| | | | |
|---|---|---|---|
| 5,858,531 A | 1/1999 | Chenite et al. | |
| 2005/0239925 A1 | 10/2005 | Ito | |

FOREIGN PATENT DOCUMENTS

| | | | |
|---|---|---|---|
| DE | 198 14 352 A1 | 10/1999 | |
| EP | 0 040 080 A2 | 11/1981 | |
| EP | 1 512 725 A1 | 3/2005 | |
| EP | 1512725 A | * 3/2005 |
| JP | 5-32795 A | 2/1993 | |
| JP | 2003-171682 A | 6/2003 | |
| JP | 2004-51942 A | 2/2004 | |
| JP | 2004-143405 A | 5/2004 | |
| WO | WO 98/17710 A | * 4/1998 |
| WO | WO-98/17710 A1 | 4/1998 | |
| WO | WO-99/50339 A1 | 10/1999 | |
| WO | WO-03/082359 A1 | 10/2003 | |

OTHER PUBLICATIONS

STN Chemical Abstract;, 1985, XP002111078.

* cited by examiner

*Primary Examiner* — Leszek Kiliman
(74) *Attorney, Agent, or Firm* — Birch, Stewart, Kolasch & Birch, LLP

(57) ABSTRACT

Fine spherical thermoplastic resin particles are produced by preparing a resin composition including a matrix of a water-soluble material, and fine particles of a water-insoluble thermoplastic resin dispersed in the matrix, the fine particles and the matrix each being melted or softened in the resin composition; cooling and solidifying the resin composition under such conditions that the resin composition does not undergo deformation due to stress; and removing the water-soluble material by washing with water to thereby yield fine spherical particles containing the water-insoluble thermoplastic resin. This method has wide applicability, applies less loads on the environment, does not require special devices, can be easily conducted, and can efficiently produce such particles. The resulting particles are highly spherical.

3 Claims, No Drawings

PRODUCTION OF FINE SPHERICAL THERMOPLASTIC RESIN PARTICLES

BACKGROUND OF THE INVENTION

1. Field of the Invention

The present invention relates to methods for producing fine spherical thermoplastic resin particles (powders). Such fine spherical thermoplastic resin particles are useful typically as cosmetic materials, fillers for coating materials, lubricants, light-diffusion additives, carriers, spacers for liquid crystal panels, and insulating fillers.

2. Description of the Related Art

Spherical thermoplastic fine resin particles are conventionally produced, for example, by a suspension polymerization method, an emulsion polymerization method, a method of mechanically dispersing or emulsifying a resin solution, or a method of precipitating fine particles from a resin solution [Japanese Unexamined Patent Application Publication (JP-A) No. 05-32795, JP-A No. 2003-171682, and JP-A No. 2004-143405]. These methods, however, require special facilities, need the use of organic solvents, have narrow applicability, and/or yield fine resin particles having only low sphericity or wide distribution of particle diameters.

JP-A No. 2004-51942 discloses a method for producing fine resin particles by melting and kneading a resin composition containing a resin component, such as a polyamide resin, and an oligosaccharide, pressing the kneaded article using a pressing machine to yield a sheet-like dispersion, cooling the dispersion, immersing the cooled dispersion in hot water to yield a suspension of resin particles, and subjecting the suspension to treatment with a membrane. This method, however, cannot significantly produce fine, highly spherical resin particles, because stress acts upon the particles during pressing of the dispersion to thereby deform the dispersed particles, and the deformed particles are cooled and solidified without mitigation of deformation.

SUMMARY OF THE INVENTION

Accordingly, an object of the present invention is to provide a method for producing fine spherical thermoplastic resin particles, which method has wide applicability, applies less loads on the environment, does not need special apparatuses, can be easily carried out, and shows high production efficiency, and to provide such fine spherical thermoplastic resin particles produced by the method.

Another object of the present invention is to provide a method for easily and conveniently producing fine spherical thermoplastic resin particles that are highly spherical and have uniform particle diameters, and to provide such fine spherical thermoplastic resin particles produced by the method.

After intensive investigations to achieve the above objects, the present inventors have found that fine, highly spherical thermoplastic resin particles can be easily, conveniently, and efficiently produced by cooling and solidifying a resin composition under specific conditions, which resin composition contains a matrix of a water-soluble material, and fine particles of a water-insoluble thermoplastic resin dispersed in the matrix; and washing the solidified resin composition with water. The present invention has been achieved based on these findings.

Specifically, the present invention provides a method for producing fine spherical thermoplastic resin particles, including the steps of preparing a resin composition containing a matrix including a water-soluble material, and fine particles including a water-insoluble thermoplastic resin and being dispersed in the matrix, the fine particles and the matrix each being melted or softened in the resin composition; cooling and solidifying the resin composition under such conditions that the resin composition does not undergo deformation due to stress; and removing the water-soluble material by washing with water to thereby yield fine spherical particles including the water-insoluble thermoplastic resin.

In this method, the resin composition can be prepared by extruding a molten mixture containing the water-insoluble thermoplastic resin and the water-soluble material using an extruder.

Fine spherical particles containing a water-insoluble thermoplastic resin can also be produced by extruding a molten mixture including a water-insoluble thermoplastic resin and a water-soluble material into a strand or a sheet using an extruder to thereby prepare a resin composition including a matrix including a water-soluble material, and fine particles including a water-insoluble thermoplastic resin and being dispersed in the matrix, the fine particles and the matrix each being melted or softened in the resin composition; cooling and solidifying the resin composition under such conditions that the resin composition does not undergo deformation due to stress; and removing the water-soluble material by washing with water to thereby yield fine spherical particles including the water-insoluble thermoplastic resin.

Preferred examples of the water-insoluble thermoplastic resin include polyamide resins, polyurethane resins, polyester resins, (meth)acrylic resins, styrenic resins, and polyolefin resins. The water-soluble material can be an oligosaccharide.

The present invention further provides fine spherical thermoplastic resin particles produced by the method. The fine particles can have an average particle diameter of, for example, about 0.01 to about 100 μm, a coefficient of variation of particle diameters of, for example, about 30% or less. The particles each have a major axis "a" and a minor axis "b", and, for example, 95% or more of the particles may have a ratio "a/b" of "a" to "b" of 1.25 or less.

The "cooling and solidifying of a resin composition under such conditions that the resin composition does not undergo deformation due to stress" in the present invention also means and includes the case where, even though the resin composition temporarily undergoes deformation due to stress, for example, even though the resin composition is slightly deformed due to its own weight on its way between a die of an extruder and a conveying device, the stress is relieved or resolved upon melting of the resin composition, the deformation becomes stable, and the resin composition is consequently cooled and solidified under such conditions that the resin composition does not undergo deformation due to stress.

According to the present invention, a resin composition containing a matrix containing a water-soluble material, and fine particles containing a water-insoluble thermoplastic resin dispersed in the matrix is cooled and solidified under such conditions that the resin composition does not undergo deformation due to stress, and the water-soluble material is then removed by washing with water. This also includes the case where even though the resin composition temporarily undergoes deformation due to stress, the stress is relieved or resolved upon melting of the resin composition, the deformation becomes stable, and the resin composition is consequently cooled and solidified under such conditions that the resin composition does not undergo deformation due to stress. Accordingly, the method does not need of using organic solvents, thereby reduces loads on the environment, does not require special apparatuses, and can be easily carried out. Thus, the method can produce fine spherical thermoplastic resin particles with high production efficiency at low cost. The resulting fine spherical thermoplastic resin particles have high sphericity and a narrow distribution of particle diameters. The method has wide applicability and can easily and conveniently produce a variety of fine resin particles.

DESCRIPTION OF THE PREFERRED EMBODIMENTS

According to the present invention, a resin composition comprising a matrix of a water-soluble material, and fine particles of a water-insoluble thermoplastic resin dispersed in the matrix is cooled and solidified under such conditions that the resin composition does not undergo deformation due to stress such as stretching, compression, or shear stress.

The water-insoluble thermoplastic resin is not specifically limited and includes, for example, polycondensation resins such as polyamide resins, polyester resins, polyurethane resins, poly(thio)ether resins, polycarbonate resin, polysulfone resins, and polyimide resins; vinyl-polymerization resins such as polyolefin resins, (meth)acrylic resins, styrenic resins, and vinyl resins; and resins derived from naturally occurring substances, such as cellulose derivatives. Each of these water-insoluble thermoplastic resins can be used alone or in combination.

The polyamide resins can be any of polyamides as polycondensation products between a diamine component (including an alkylenediamine having about four to about ten carbon atoms, such as hexamethylenediamine) and a dicarboxylic acid component (including an alkylenedicarboxylic acid having about four to about twenty carbon atoms, such as adipic acid); polyamides as polycondensation products of an aminocarboxylic acid including an aminocarboxylic acid having about four to about twenty carbon atoms, such as w-aminoundecanoic acid; polyamides as ring-opening polymerization products of a lactam including a lactam having about four to about twenty carbon atoms, such as ω-laurolactam; and polyesteramides as polycondensation products among a diamine component (including an alkylenediamine having about four to about ten carbon atoms, such as hexamethylenediamine), a dicarboxylic acid component (including an alkylenedicarboxylic acid having about four to about twenty carbon atoms, such as adipic acid), and a diol component (including an alkylenediol having about two to about twelve carbon atoms, such as ethylene glycol). The polyamide resins include homopolyamides and copolyamides. Representative examples of the polyamide resins are polyamide 46, polyamide 6, polyamide 66, polyamide 612, polyamlide 610, polyamide 910, polyamide 912, polyamide 1212, polyamide 1012, polyamide 1010, polyamide 11, polyamide 12, polyamide 6T, and polyamide 9T.

The polyester resins can be any of polyester resins such as polyesters as polycondensation products between a diol component and a dicarboxylic acid component; polyesters as polycondensation products of an hydroxycarboxylic acid; polyesters as ring-opening polymerization products of a lactone (e.g., a lactone having about four to about twelve carbon atoms, such as ε-caprolactone); and polyesters containing urethane bond, as reaction products between a polyester diol and diisocyanate. Examples of the diol component herein include aliphatic diols having about two to about twelve carbon atoms, such as ethylene glycol; polyoxy($C_{2-4}$ alkylene) glycols such as diethylene glycol; alicyclic diols having about five to about fifteen carbon atoms, such as cyclohexanedimethanol; and aromatic diols having about six to about twenty carbon atoms, such as bisphenol-A. Examples of the dicarboxylic acid component are aromatic dicarboxylic acids having about eight to about twenty carbon atoms, such as terephthalic acid; aliphatic dicarboxylic acids having about two to about forty carbon atoms, such as adipic acid; and alicyclic dicarboxylic acids having about eight to about fifteen carbon atoms, such as cyclohexanedicarboxylic acid. Examples of the hydroxycarboxylic acid are aliphatic hydroxycarboxylic acids having about two to about six carbon atoms, such as lactic acid; and aromatic hydroxycarboxylic acids having about seven to about nineteen carbon atoms, such as hydroxybenzoic acid. The polyester resins include homopolyesters and copolyesters.

The polyurethane resins include resins as reaction products among a diisocyanate, a polyol, and optionally a chain extender. Examples of the diisocyanate are aliphatic diisocyanates such as hexamethylene diisocyanate; alicyclic diisocyanates such as isophorone diisocyanate; and aromatic diisocyanates such as tolylene diisocyanate. Examples of the polyol are polyester diols, polyether diols, and polycarbonate diols. The chain extender includes, for example, alkylenediols having about two to about ten carbon atoms, such as ethylene glycol; aliphatic diamines such as ethylenediamine; alicyclic diamines such as isophoronediamine; and aromatic diamines such as phenylenediamine.

The polyolefin resins include, for example, polyethylenes, polypropylenes, ethylene-propylene copolymers, ethylene-(meth)acrylic acid copolymers, ethylene-(meth)acrylate copolymers, and ethylene-vinyl acetate copolymers. The (meth)acrylic resins include, for example, poly(methyl methacrylate)s, and methyl methacrylate-acrylate copolymers. Examples of the styrenic resins are polystyrene and styrene-(meth)acrylate copolymers. Examples of the vinyl resins are vinyl chloride resins, fluorocarbon resins, and vinyl ester resins. The cellulose derivatives include, for example, cellulose esters, cellulose ethers, and cellulose carbamates.

Among them, polyamide resins, polyester resins, polyurethane resins, (meth)acrylic resins, styrenic resins, and polyolefin resins are preferred as the water-insoluble thermoplastic resin, of which polyamide resins, polyester resins, and polyurethane resins are more preferred.

The water-soluble material is not specifically limited but is preferably a water-soluble material that can molten or softened at such temperatures that the water-insoluble thermoplastic resin is molten or softened, for example, at about 100° C. to about 300° C., that can thereby be kneaded with the water-insoluble thermoplastic resin, and that can separate from the water-insoluble thermoplastic resin into two phases in a molten or solidified state. Examples of such water-soluble materials are saccharides including monosaccharides, oligosaccharides, polysaccharides, sugar alcohols, polydextroses, maltodextrin, and inulin; hydrogenated products and hydrolyzed products of these saccharides; and water-soluble resins. The hydrogenated products and hydrolyzed products of the saccharides include hydrogenated hexoses, hydrogenated disaccharides, hydrogenated starches, invert sugar, and hydrogenated or non-hydrogenated decomposed products of starches.

The oligosaccharides include homooligosaccharides comprising two to ten molecules of a monosaccharide being bonded through glycoside linkages as a result of dehydrative condensation, and heterooligosaccharides comprising two to ten molecules of two or more different monosaccharides and/or sugar alcohols being bonded through glycoside linkages as a result of dehydrative condensation. Representative examples of the oligosaccharides are disaccharides such as trehalose, maltose, isomaltose, isomaltulose, maltitol, cellobiose, gentiobiose, lactose, lactitol, sucrose, 1,6-GPS (6-O-

α-D-glucopyranosyl-D-sorbitol), 1,1-GPS (1-O-α-D-glucopyranosyl-D-sorbitol), and 1,1-GPM (1-O-α-D-glucopyranosyl-D-mannitol); trisaccharides such as cellotriose, gentianose, maltotriose, and raffinose; tetrasaccharides such as lycotetraose, maltotetraose, and stachyose; pentasaccharides such as maltopentaose and verbascose; hexasaccharides such as maltohexaose; as well as tri-, tetra- or penta-saccharides such as maltodextrin; and hepta- or octasaccharides such as dextrin's and cyclodextrin.

The oligosaccharides can also be oligosaccharide compositions as decomposed products of polysaccharides. Such oligosaccharide compositions include starch sugars, galactooligosaccharides, coupling sugars, fructooligosaccharides, xylooligosaccharides, soybean oligosaccharides, chitin oligosaccharides, and chitosan oligosaccharides. The oligosaccharides can be any of reduced-form (maltose-type) oligosaccharides and non-reduced-form (trehalose-type) oligosaccharides. Reduced-form oligosaccharides are preferred herein for their high thermostability. Each of these oligosaccharides can be used alone or in combination.

Examples of the monosaccharides are xylose, ribulose, glucose, mannose, galactose, fructose, and sorbose. The sugar alcohols include, for example, erythritol, pentaerythritol, arabitol, ribitol, xylitol, sorbitol, mannitol, and galactitol. The polysaccharides are saccharides comprising eleven or more molecules of one or more monosaccharides and/or sugar alcohols being bonded through glycoside linkages as a result of dehydrative condensation. Examples thereof are inulin, achrodextrin, polydextrose, amylose, amylopectin, starches, and celluloses. Examples of the water-soluble resins are linear polymers intramolecularly having a hydrophilic group such as —CONH—, —COOH, or —OH, including polyacrylamides, poly(acrylic acid)s, poly(methacrylic acid)s, poly(itaconic acid)s, and poly(vinyl alcohol)s. Each of these water-soluble materials can be used alone or in combination. Among these water-soluble materials, oligosaccharides such as homooligosaccharides and heterooligosaccharides are preferred, of which homooligosaccharides and heterooligosaccharides comprising two to six molecules of monosaccharides and/or sugar alcohols as a result of dehydrative condensation are more preferred, because they are excellent in balance between melting temperature and melting viscosity.

A water-soluble plasticizing component can be additionally used for adjusting the viscosity when one or more oligosaccharides such as maltitol and maltotetraose are used as the water-soluble material. The water-soluble plasticizing component can be saccharides as the water-soluble materials other than oligosaccharides, such as monosaccharides and sugar alcohols. The monosaccharides and sugar alcohols herein can be as with those mentioned above. Among them, sugar alcohols such as erythritol, pentaerythritol, xylitol, and sorbitol are preferred. The amount of the water-soluble plasticizing component, if used in combination with one or more oligosaccharides, is, for example, about 0.1 to about 100 parts by weight, preferably about 1 to about 80 parts by weight, and more preferably about 2 to about 50 parts by weight, to 100 parts by weight of the oligosaccharides.

The resin composition comprising a matrix of a water-soluble material, and fine particles of a water-insoluble thermoplastic resin dispersed in the matrix can be prepared by extruding a molten mixture of a water-insoluble thermoplastic resin and a water-soluble material using an extruder. The ratio of the water-insoluble thermoplastic resin to the water-soluble material is not limited, as long as the dispersion can be achieved, and the ratio is, for example, about 1/99 to about 60/40 (by weight), preferably about 5/95 to about 50/50 (by weight), and more preferably about 10/90 to about 45/55 (by weight).

A dispersion of fine spherical particles comprising a water-insoluble thermoplastic resin and having substantially uniform sizes can be prepared by melting and admixing the water-insoluble thermoplastic resin and the water-soluble material. The melting, admixing and extrusion can be carried out using a general kneader or extruder such as single-screw extruder or twin-screw extruder. The resin composition upon extrusion preferably has a viscosity of, for example, about 1 to 10000 Pa·s in terms of melting viscosity as determined with a capillograph at the extrusion temperature. The melting and admixing is preferably carried out in an atmosphere of an inert gas such as nitrogen gas.

If necessary, the resin composition may further comprise additives such as fillers; plasticizers; softening agents; lubricants; stabilizers such as heat stabilizers, antioxidants, and ultraviolet absorbers; tackifiers; colorants such as titanium oxide, carbon black, and pigments; metal powders; dispersing agents; flame-retarders; and antistatics.

The resulting extrudate of the resin composition can be any of strands and sheets. The strands may have a diameter of, for example, about 0.1 to about 10 mm, and preferably about 0.5 to about 5 mm. The sheets may have a thickness of, for example, about 0.1 to about 10 mm, and preferably about 0.5 to about 5 mm.

The resin composition just extruded from the extruder is in a molten state, and in this state, the diameters of fine particles in the resin composition can be set as appropriate according to ultimate resin particles, and are, for example, about 0.01 to about 100 μm, preferably about 0.05 to about 80 μm, and more preferably about 0.1 to about 60 μm. The sizes (dimensions) of the fine particles can be controlled, for example, by adjusting conditions or parameters such as the type of the water-insoluble thermoplastic resin, the type of the water-soluble material, the ratio of the water-insoluble thermoplastic resin to the water-soluble material, the melting temperature, the structure of the screw(s), and the rotation rate of the screw(s).

A key feature of the present invention is that a resin composition comprising a matrix of a water-soluble material, and fine particles of a water-insoluble thermoplastic resin dispersed in the matrix is cooled and solidified under such conditions that the resin composition does not undergo deformation due to stress such as stretching, compression, or shear stress, in which the fine particles and the matrix in the resin composition are each melted or softened before cooling and solidifying. If the resin composition is cooled and solidified under the application of stress such as stretching, compression, or shear stress, deformed particles are solidified and fixed as intact, and the resulting fine thermoplastic resin particles have low sphericity.

When the resin composition comprising a matrix of a water-soluble material, and fine particles of a water-insoluble thermoplastic resin dispersed in the matrix is prepared, for example, by extruding a molten mixture of the water-insoluble thermoplastic resin and the water-soluble material using an extruder, the resin composition can be cooled under such conditions that it does not undergo deformation due to stress, for example, in the following manner. A conveying device, such as a belt conveyer, that moves horizontally in an extrusion direction is arranged below a die at such a position that is not so far from holes of the die; the resin composition is extruded onto the conveying device; the conveying device is moved at a speed substantially equal to the extrusion speed of the extruder; and the resin composition is cooled by air and is thereby solidified.

In this case, the vertical distance from the lower end of the orifice of the die to the upper surface of the conveying device is preferably less than about 10 cm, more preferably about 9 cm or less, and particularly preferably about 7 cm or less. If the distance is about 10 cm or more, fine spherical thermoplastic resin particles having high sphericity may not be significantly obtained, because the resin composition is stretched due to its own weight when the resin composition falls from the orifice, and fine particles in the resin composition deform. The shorter the distance is, the more it is preferred, as long as the extrusion and conveying of the resin composition can be carried out without problems. The traveling speed of the conveying device preferably falls within about ±10% of the extrusion speed of the extruder, more preferably within about ±5% of the extrusion speed, and particularly preferably within about ±2% of the extrusion speed. If the traveling speed of the conveying device is out of the above-specified ranges, fine, highly spherical thermoplastic resin particles may not be significantly obtained, because the resin composition is stretched or compressed, and fine particles in the resin composition may often deform. The extrusion speed of the extruder is generally about 0.1 to about 100 m/min., and preferably about 1 to about 50 m/min.

The conveying distance (traveling distance) and conveying time (traveling time) of the conveying device can be set as appropriate in consideration typically of the cooling rate and production efficiency. For example, the conveying distance is generally about 0.1 to about 100 meters, and preferably about 0.5 to about 10 meters, and the conveying time is generally about 0.1 to about 60 minutes, and preferably about 0.2 to about 30 minutes.

The resin composition can be cooled by any procedure such as air-cooling, water-cooling, and a combination of these procedures. When the resin composition is cooled while conveying by a conveying device as mentioned above, the conveying device may be cooled by a cooling device. The cooling temperature in air cooling is, for example, about 0° C. to about 35° C.

According to the present invention, fine spherical thermoplastic resin particles comprising the water-insoluble thermoplastic resin are obtained by cooling and solidifying the resin composition, and dissolving and removing the water-soluble material therefrom by washing with water. The washing with water can be conducted, but is not limited to, by placing the cooled and solidified resin composition in water, and dissolving the water-soluble material constituting the matrix in water while stirring. The temperature upon washing with water can be set as appropriate within ranges not adversely affecting the spherical shapes of fine particles and is, for example, about 0° C. to about 100° C. The temperature can also be a temperature exceeding 100° C. If necessary, the washing water used herein may comprise an organic solvent so as to remove water-insoluble impurities.

After washing with water, the fine spherical thermoplastic resin particles can be recovered by subjecting the aqueous dispersion which comprises fine spherical thermoplastic resin particles of the water-insoluble thermoplastic resin dispersed in water to a conventional separation process such as filtration or centrifugal separation, and caring out drying.

The resulting fine spherical thermoplastic resin particles have an average particle diameter of generally about 0.01 to about 100 µm, preferably about 0.05 to about 80 µm, more preferably about 0.1 to about 60 µm, and especially preferably about 0.1 to about 30 µm. The fine spherical particles have substantially uniform particle diameters, and the coefficient of variation of particle diameters is generally about 30% or less, and preferably about 20% or less. The coefficient of variation of particle diameters can be determined according to the following equation:

Coefficient of variation of particle diameters (%)= [(Standard deviation of particle diameter)/(Number-average particle diameter)]×100

The fine spherical thermoplastic resin particles produced by the method according to the present invention have high sphericity, in which the particles each have a major axis (largest diameter) "a" and a minor axis (smallest diameter) "b", and 95% or more of the particles have a ratio "a/b" of "a" to "b" of, for example, about 1.25 or less, preferably about 1.10 or less, and more preferably about 1.05 or less. The particles are more spherical with a ratio "a/b" approaching to 1. The sphericity in terms of the ratio "a/b" can be determined by producing images of particles typically by three-dimensional scanning, and analyzing the images typically by using a computer. The sphericity can be substituted by a circularity. The circularity can be determined by producing images of particles typically using two-dimensional scanning and analyzing the images typically using a computer. When such fine spherical thermoplastic resin particles having high sphericity are used as cosmetic materials, the resulting cosmetics are more lubricative and spread better. The fine spherical thermoplastic resin particles have reduced variation in particle diameter and are also useful typically as spacers for liquid crystals.

EXAMPLES

The present invention will be illustrated in further detail with reference to several examples below, which by no means limit the scope of the present invention. The sphericity, coefficient of variation of particle diameters, and average particle diameters of thermoplastic fine resin particles were determined by the following methods.

Sphericity and Coefficient of Variation of Particle Diameters

A suitable amount of sample fine resin particles was dispersed in pure water to yield a suspension, and the suspension was placed dropwise onto a sample stage of a scanning electron microscope (JEOL LTD., JSM-6480) and was dried under reduced pressure. Vapor of platinum was deposited on surfaces of the dried fine resin particles, and electron micrographs of the particles were taken. One hundred particles were extracted at random from fine resin particles in the electron micrographs, and the major axis "a" and the minor axis "b" of each of the particles were determined, the ratios (a/b) were determined, and a histogram of the ratios "a/b" was plotted. The proportion of particles having a ratio "a/b" at a predetermined level or less was determined by calculation based on the histogram, and this was defined as the sphericity. Additionally, the standard deviation and coefficient of variation of particle diameters (circle-equivalent particle diameters) were determined by calculation.

Average Particle Diameter

The shapes of the produced fine resin particles were observed with a scanning electron microscope. In addition, a suitable amount of the fine resin particles was dispersed in pure water to yield a suspension, and the median diameter was determined using a laser scattering particle size distribution analyzer (Horiba, Ltd., LA-910).

Example 1

A polyamide 12 [a product of Daicel-Degussa Ltd. under the trade name of "DAIAMID L1640"] (35 parts by weight)

and an oligosaccharide [a product of NIHON SHOKUHIN KAKO CO., LTD. under the trade name of "Fujioligo #450P"](100 parts by weight) were continuously fed at a rate of 3 kg per hour to a twin-screw extruder set at 200° C. having a die equipped with three die holes horizontally arranged, were melted and kneaded therein, were extruded from the die holes in a horizontal direction into strands having a diameter of about 4 mm, were placed and conveyed on a belt conveyer arranged directly below the die and traveling horizontally, were fed into water in a vessel, in which the oligosaccharide was dissolved in water to thereby yield an aqueous dispersion of polyamide particles. The vertical distance from the lower end of die holes to the upper surface of the belt conveyer was set at about 5 cm, and the traveling speed of the belt conveyer was set at the same speed as the resin composition was extruded (6 m/min.). The extruded strand-form resin composition was conveyed a distance of 2 m and was cooled and solidified during the conveying. The strand-form resin composition was cooled and solidified while not undergoing deformation due to stress, because it was not stretched before placed on the belt conveyer and was not compressed during conveying on the belt conveyer. The amount of water in the vessel was 900 parts by weight to 100 parts by weight of the resin composition.

Next, the aqueous dispersion of polyamide particles was continuously filtrated through a filter paper No. 5C. The recovered residue (particles) was dispersed in water to a concentration of 5 percent by weight and was subjected to filtration again. The polyamide particles were washed by repeating this procedure three times, were then dried, and thereby yielded spherical polyamide particles. The resulting spherical polyamide particles have such sphericity that 100% of the particles have a ratio "a/b" of 1.25 or less, 99% of the particles have a ratio "a/b" of 1.10 or less, 98% of the particles have a ratio "a/b" of 1.05 or less, the coefficient of variation of particle diameters is 15%, and the median diameter is 10 μm.

Example 2

Spherical polyamide particles were produced by the procedure of Example 1, except for using 35 parts by weight of a polyamide 612 [a product of Daicel-Degussa Ltd. under the trade name of "D1840"] instead of the polyamide 12 [a product of Daicel-Degussa Ltd. under the trade name of "DAIAMID L1640"], and for extruding the resin composition at 220° C. instead of 200° C. The resulting spherical polyamide particles have such sphericity that 100% of the particles have a ratio "a/b" of 1.25 or less, 98% of the particles have a ratio "a/b" of 1.10 or less, 96% of the particles have a ratio "a/b" of 1.05 or less, the coefficient of variation of particle diameters is 17%, and the median diameter is 13 μm.

Example 3

Spherical polyamide particles were produced by the procedure of Example 1, except for using 35 parts by weight of a polystyrene [a product of PS Japan Corporation under the trade name of "HF-77"] instead of the polyamide 12 [a product of Daicel-Degussa Ltd. under the trade name of "DAIAMID L1640"]. The resulting spherical polystyrene particles have such sphericity that 100% of the particles have a ratio "a/b" of 1.25 or less, 99% of the particles have a ratio "a/b" of 1.10 or less, 98% of the particles have a ratio "a/b" of 1.05 or less, the coefficient of variation of particle diameters is 16%, and the median diameter is 9 μm.

Comparative Example 1

Polyamide particles were produced by the procedure of Example 1, except that the belt conveyer was arranged 1 m below the die holes. The strand-form resin composition was deformed by stress in a vertical direction due to its own weight. The resulting polyamide particles are ellipsoidal and have such sphericity that 1% of the particles have a ratio "a/b" of 1.25 or less, 0% of the particles have a ratio "a/b" of 1.10 or less, the coefficient of variation of particle diameters is 50%, and the average major axis is 60 μm.

What is claimed is:

1. Fine spherical thermoplastic resin particles produced by a method comprising the steps of:
preparing a resin composition comprising:
a matrix comprising a water-soluble material, and
fine particles comprising a water-insoluble thermoplastic resin and being dispersed in the matrix,
the fine particles and the matrix each being melted or softened in the resin composition;
cooling and solidifying the resin composition under such conditions that the resin composition does not undergo deformation due to stress; and
removing the water-soluble material by washing with water to thereby yield fine spherical particles comprising the water-insoluble thermoplastic resin,
wherein the particles each have a major axis "a" and a minor axis "b", and wherein 95% or more of the particles have a ratio "a/b" of "a" to "b" of 1.25 or less,
wherein the water-soluble material is a material that moltens or softens at temperatures at which the water-insoluble thermoplastic resin is molten or softened, that can thereby be kneaded with the water-insoluble thermoplastic resin, and that separates from the water-insoluble thermoplastic resin into two phases in a molten or solidified state,
wherein the fine spherical thermoplastic resin particles have an average particle diameter of 0.1 to 30 μm, and
wherein a coefficient of variation of particle diameters of the fine spherical thermoplastic resin particles is 20% or less.

2. A method for producing fine spherical thermoplastic resin particles, comprising the steps of:
preparing a resin composition comprising:
a matrix comprising a water-soluble material, and
fine particles comprising a water-insoluble thermoplastic resin and being dispersed in the matrix,
the fine particles and the matrix each being melted or softened in the resin composition;
cooling and solidifying the resin composition under such conditions that the resin composition does not undergo deformation due to stress; and
removing the water-soluble material by washing with water to thereby yield fine spherical particles comprising the water-insoluble thermoplastic resin,
wherein the ratio (a/b) of each particle is 1.25 or less, a represents the major axis of each particle and b represents the minor axis of each particle,
wherein the water-soluble material is a material that moltens or softens at temperatures at which the water-insoluble thermoplastic resin is molten or softened, that can thereby be kneaded with the water-insoluble thermoplastic resin, and that separates from the water-insoluble thermoplastic resin into two phases in a molten or solidified state,
wherein the fine spherical thermoplastic resin particles have an average particle diameter of 0.1 to 30 μm, and
wherein a coefficient of variation of particle diameters of the fine spherical thermoplastic resin particles is 20% or less.

3. A method for producing fine spherical thermoplastic resin particles, comprising the steps of:
preparing a resin composition comprising:
a matrix comprising a water-soluble material, and
fine particles comprising a water-insoluble thermoplastic resin and being dispersed in the matrix,
the fine particles and the matrix each being melted or softened in the resin composition;
cooling and solidifying the resin composition under such conditions that the resin composition does not undergo deformation due to stress; and
removing the water-soluble material by washing with water to thereby yield fine spherical particles comprising the water-insoluble thermoplastic resin,
wherein the step of preparing a resin composition comprises extruding a molten mixture comprising the water-insoluble thermoplastic resin and the water-soluble material using an extruder to thereby prepare the resin composition,
wherein the resin composition is extruded onto a conveying device arranged below a die,
wherein a vertical distance from a lower end of an orifice of the die to an upper surface of the conveying device is less than about 10 cm,
wherein the water-soluble material is a material that moltens or softens at temperatures at which the water-insoluble thermoplastic resin is molten or softened, that can thereby be kneaded with the water-insoluble thermoplastic resin, and that separates from the water-insoluble thermoplastic resin into two phases in a molten or solidified state,
wherein the fine spherical thermoplastic resin particles have an average particle diameter of 0.1 to 30 μm, and
wherein a coefficient of variation of particle diameters of the fine spherical thermoplastic resin panicles is 20% or less.

* * * * *